United States Patent
Branover et al.

(10) Patent No.: US 9,021,209 B2
(45) Date of Patent: Apr. 28, 2015

(54) CACHE FLUSH BASED ON IDLE PREDICTION AND PROBE ACTIVITY LEVEL

(75) Inventors: Alexander Branover, Chestnut Hill, MA (US); Maurice B. Steinman, Marlborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 484 days.

(21) Appl. No.: 12/702,085

(22) Filed: Feb. 8, 2010

(65) Prior Publication Data

US 2011/0113202 A1    May 12, 2011

Related U.S. Application Data

(60) Provisional application No. 61/258,798, filed on Nov. 6, 2009.

(51) Int. Cl.
*G06F 12/08* (2006.01)

(52) U.S. Cl.
CPC ........ *G06F 12/0808* (2013.01); *G06F 12/0831* (2013.01); *G06F 2212/1028* (2013.01)

(58) Field of Classification Search
None
See application file for complete search history.

(56) References Cited

U.S. PATENT DOCUMENTS

| | | | |
|---|---|---|---|
| 5,530,932 A * | 6/1996 | Carmean et al. | 713/324 |
| 5,541,850 A | 7/1996 | Vander Zanden et al. | |
| 5,628,020 A | 5/1997 | O'Brien | |
| 5,737,615 A | 4/1998 | Tetrick | |
| 5,740,417 A | 4/1998 | Kennedy et al. | |
| 5,813,022 A * | 9/1998 | Ramsey et al. | 711/3 |
| 5,884,088 A | 3/1999 | Kardach et al. | |
| 6,125,450 A * | 9/2000 | Kardach | 713/323 |
| 6,141,283 A | 10/2000 | Bogin et al. | |
| 6,282,662 B1 | 8/2001 | Zeller et al. | |
| 6,360,337 B1 * | 3/2002 | Zak et al. | 714/47.1 |
| 6,480,965 B1 | 11/2002 | Harriman et al. | |
| 6,496,895 B1 | 12/2002 | Harriman et al. | |
| 6,510,525 B1 | 1/2003 | Nookala et al. | |

(Continued)

FOREIGN PATENT DOCUMENTS

| | | |
|---|---|---|
| EP | 1024432 A1 | 2/2000 |
| EP | 1607838 A1 | 12/2005 |

(Continued)

OTHER PUBLICATIONS

Chinnakrishnan S. Ballapuram et al. "Exploiting Access Semantics and Program Behavior to Reduce Snoop Power in Chip Multiprocessors." Mar. 2008. ACM. ASPLOS'08.*

(Continued)

*Primary Examiner* — Nathan Sadler
(74) *Attorney, Agent, or Firm* — Abel Law Group, LLP

(57) ABSTRACT

A processing node tracks probe activity level associated with its cache. The processing node and/or processing system further predicts an idle duration. If the probe activity level increases above a threshold probe activity level, and the idle duration prediction is above a threshold idle duration threshold, the processing node flushes its cache to prevent probes to the cache. If the probe activity level is above the threshold probe activity level but the predicted idle duration is too short, the performance state of the processing node is increased above its current performance state to provide enhanced performance capability in responding to the probe requests.

20 Claims, 7 Drawing Sheets

(56) References Cited

U.S. PATENT DOCUMENTS

| | | | |
|---|---|---|---|
| 6,553,501 B1 | 4/2003 | Yokoe | |
| 6,711,691 B1* | 3/2004 | Howard et al. | 713/300 |
| 6,760,852 B1 | 7/2004 | Gulick | |
| 6,954,864 B2 | 10/2005 | Schelling | |
| 6,976,181 B2* | 12/2005 | Dai et al. | 713/320 |
| 6,988,214 B1 | 1/2006 | Verdun | |
| 7,028,200 B2 | 4/2006 | Ma | |
| 7,051,218 B1 | 5/2006 | Gulick et al. | |
| 7,146,510 B1 | 12/2006 | Helms et al. | |
| 7,152,169 B2* | 12/2006 | Cooper et al. | 713/320 |
| 7,159,766 B2 | 1/2007 | Wurzburg et al. | |
| 7,162,404 B2 | 1/2007 | Hunt et al. | |
| 7,174,467 B1 | 2/2007 | Helms et al. | |
| 7,200,544 B1 | 4/2007 | McCown | |
| 7,200,762 B2 | 4/2007 | Pearl | |
| 7,231,534 B2* | 6/2007 | Ma | 713/323 |
| 7,299,370 B2 | 11/2007 | George et al. | |
| 7,315,952 B2 | 1/2008 | Wilcox et al. | |
| 7,444,526 B2 | 10/2008 | Felter et al. | |
| 7,454,632 B2 | 11/2008 | Kardach et al. | |
| 7,469,349 B2 | 12/2008 | Han et al. | |
| 7,472,299 B2 | 12/2008 | Mukherjee | |
| 7,475,263 B2 | 1/2009 | Wei et al. | |
| 7,523,324 B2 | 4/2009 | Ma | |
| 7,613,934 B2 | 11/2009 | Hou et al. | |
| 7,624,286 B2 | 11/2009 | Lin et al. | |
| 7,644,293 B2 | 1/2010 | Sistla et al. | |
| 7,750,912 B2 | 7/2010 | Polzin et al. | |
| 7,788,516 B2 | 8/2010 | Conroy et al. | |
| 7,949,887 B2 | 5/2011 | Gunther et al. | |
| 7,966,506 B2 | 6/2011 | Bodas et al. | |
| 8,112,651 B2 | 2/2012 | Wang et al. | |
| 8,140,868 B2 | 3/2012 | Felter et al. | |
| 8,190,939 B2 | 5/2012 | Fields et al. | |
| 8,209,559 B2 | 6/2012 | Memon et al. | |
| 2002/0103976 A1* | 8/2002 | Steely et al. | 711/135 |
| 2003/0204760 A1* | 10/2003 | Youngs | 713/320 |
| 2003/0229821 A1 | 12/2003 | Ma | |
| 2005/0028015 A1* | 2/2005 | Asano et al. | 713/320 |
| 2005/0039063 A1 | 2/2005 | Hsu et al. | |
| 2005/0144487 A1 | 6/2005 | Puffer et al. | |
| 2005/0273633 A1 | 12/2005 | Wilcox et al. | |
| 2005/0273635 A1* | 12/2005 | Wilcox et al. | 713/320 |
| 2005/0289369 A1 | 12/2005 | Chung et al. | |
| 2006/0031692 A1 | 2/2006 | Kato et al. | |
| 2006/0047987 A1 | 3/2006 | Prabhakaran et al. | |
| 2006/0053326 A1* | 3/2006 | Naveh et al. | 713/323 |
| 2006/0143409 A1 | 6/2006 | Merrell et al. | |
| 2006/0174142 A1 | 8/2006 | Lin et al. | |
| 2006/0174151 A1 | 8/2006 | Lin et al. | |
| 2006/0294406 A1* | 12/2006 | Cline | 713/320 |
| 2007/0011480 A1 | 1/2007 | Banginwar et al. | |
| 2007/0115290 A1 | 5/2007 | Polzin et al. | |
| 2007/0143640 A1 | 6/2007 | Simeral et al. | |
| 2007/0157042 A1* | 7/2007 | Jahagirdar et al. | 713/320 |
| 2008/0005596 A1 | 1/2008 | Sistla et al. | |
| 2008/0028240 A1* | 1/2008 | Arai et al. | 713/300 |
| 2008/0077813 A1* | 3/2008 | Keller et al. | 713/320 |
| 2008/0082769 A1* | 4/2008 | Bouchou et al. | 711/161 |
| 2008/0141265 A1 | 6/2008 | Choi | |
| 2008/0235364 A1* | 9/2008 | Gorbatov et al. | 709/224 |
| 2008/0301475 A1 | 12/2008 | Felter et al. | |
| 2009/0150696 A1 | 6/2009 | Song et al. | |
| 2009/0164814 A1 | 6/2009 | Axford et al. | |
| 2009/0235105 A1 | 9/2009 | Branover et al. | |
| 2009/0259862 A1* | 10/2009 | Bulusu et al. | 713/322 |
| 2010/0058000 A1 | 3/2010 | Moyer et al. | |
| 2010/0162014 A1 | 6/2010 | Memon et al. | |
| 2010/0185820 A1* | 7/2010 | Hughes et al. | 711/135 |
| 2010/0185821 A1* | 7/2010 | Paver et al. | 711/146 |
| 2010/0287394 A1* | 11/2010 | Branover et al. | 713/323 |
| 2011/0022857 A1* | 1/2011 | Nussbaum et al. | 713/300 |
| 2011/0078478 A1* | 3/2011 | Branover et al. | 713/323 |
| 2011/0112798 A1 | 5/2011 | Branover et al. | |
| 2011/0113202 A1 | 5/2011 | Branover et al. | |
| 2011/0148887 A1 | 6/2011 | Chong et al. | |
| 2011/0264934 A1 | 10/2011 | Branover et al. | |
| 2011/0296222 A1 | 12/2011 | Tan et al. | |
| 2013/0103906 A1* | 4/2013 | Bannon et al. | 711/135 |

FOREIGN PATENT DOCUMENTS

| | | |
|---|---|---|
| WO | 2007103051 | 9/2007 |
| WO | 2008007273 A2 | 1/2008 |

OTHER PUBLICATIONS

Jonathan S. Turner. "New Directions in Communications (or Which Way to the Information Age?)" Oct. 1986. IEEE. IEEE Communications Magazine. vol. 24. No. 10. pp. 8-15.*

Steven S. Muchnick. Advanced Compiler Design and Implementation. 1997. Morgan Kaufmann. p. 337.*

International Search Report and Written Opinion mailed Feb. 22, 2011 in PCT/US2010/055598, 10 pages.

"Optimized Buffer Flush/Fill," PCI-SIG Draft Engineering Change Notice, Intel Corporation, Feb. 27, 2009, 16 pages.

Naveh, Alon, et al., "Power and Thermal Management in the Intel® Core™ Duo Processor," Intel Technology Journal, vol. 10, issue 02, May 15, 2006, pp. 109-122, URL: <http://developer.intel.com/technology/itj/index.htm>.

U.S. Appl. No. 12/566,930, filed Sep. 25, 2009, entitled "Method and Apparatus for Transitioning Devices Between Power States Based on Activity Request Frequency," naming inventors Alexander Branover et al.

U.S. Appl. No. 12/623,997, filed Nov. 23, 2009, entitled "Controlling Performance/Power by Frequency Control of the Responding Node," naming inventors Alexander Branover et al.

Naveh, Alon, et al., "Power and Thermal Management in the Intel® Core T™ Duo Processor," Intel Technology Journal, vol. 10, issue 02, May 15, 2006, pp. 109-122, URL: <http://developer.intel.com/technology/itj/index.htm>.

Optimized Buffer Flush/Fill, PCI-Sig Draft Engineering Change Notice, Intel Corporation, Feb. 27, 2009. 16 Pages.

U.S. Appl. No. 12/566,930, filed Sep. 25, 2009, entitled "Method and Apparatus for Transpositioning Devices Between Power States Based on Activity Request Frequency," naming inventors Alexander Branover et al.

U.S. Appl. No. 12/702,085, filed Feb. 8, 2010, entitled "Cache Flush Based on Idle Prediction and Probe Activity Level," naming inventors Alexander Branover et al.

U.S. Appl. No. 12/436,439, filed May 6, 2009, entitled "North-Bridge to South-Bridge Protocol for Placing Processor in Low Power State," naming inventors Alexander Branover et al.

Turner, Jonathan S., "New Directions in Communications (or Which Way to the Information Age?)," Oct. 1986, IEEE, IEEE Communications Magazine, vol. 24, No. 10, pp. 8-15.

Muchnick, Steven S., "Advanced Compiler Design and Implementation," 1997, Morgan Kaufmann, p. 337.

Ballapuram, Chinnakrishnan S. et al., "Exploiting Access Semantics and Program Behavior to Reduce Snoop Power in Chip Multiprocessors," Mar. 2008, ACM, ASPLOS'08, pp. 60-69.

* cited by examiner

CACHE FLUSH BASED ON IDLE PREDICTION AND PROBE ACTIVITY LEVEL

CROSS-REFERENCE TO RELATED APPLICATION(S)

This application claims the benefit of U.S. provisional application No. 61/258,798, filed Nov. 6, 2009, entitled "Controlling Performance/Power by Frequency Control of the Responding Node," naming inventors Alexander Branover et al., which application is hereby incorporated by reference.

This application relates to U.S. application Ser. No. 12/623,997, filed Nov. 23, 2009, published as U.S. Patent Application Publication No. 2011-0112798, entitled "Controlling Performance/Power by Frequency Control of the Responding Node," naming as inventors Alexander Branover et al., which application is hereby incorporated by reference.

BACKGROUND

1. Field of the Invention

This invention relates to performance of computer systems and more particularly to performance associated with cache memory.

2. Description of the Related Art

A processing node in a computer system may be placed in any of multiple performance states (or operational states) Pn, where the particular performance state (or P-state) is characterized by an associated voltage and frequency. The Advanced Configuration and Power Interface (ACPI) Specification defines the active state C0 and various low power states C1-C4. Some processors define additional low power states. Associated with the C0 state are various performance states. One factor for determining the appropriate performance state of a node is its utilization. Utilization is the ratio of the time spent by the processing node in the active (execution) state to the overall time interval over which the execution time was tracked or measured. For example, if the overall time interval was 10 milliseconds (ms) and the processor node spent 6 ms in the active (C0) state, then the utilization of the processor node is 6/10=60%. The processor node spends the remaining 4 ms in the idle (non-C0) state where code execution is suspended. A higher node utilization triggers the selection of a higher performance state P higher voltage and frequency to better address performance efficiency requirements, as measured by performance per watt. Normally the decision to transition the processing node between performance states is made by either the operating system (OS), or high-level software, a driver, or some hardware controller. For example, if the processing node runs at a low performance state resulting in longer code execution time, the system perceives the need for a higher utilization and triggers software or hardware to transition the processing node to a higher performance state where it can complete code execution faster and spend more time in the idle state. That allows increased power savings from an overall better performance per watt. While using utilization as a trigger can provide increased performance per watt in some situations, it fails to address some issues associated with better performance per watt or preventing its degradation.

SUMMARY OF EMBODIMENTS OF THE INVENTION

Accordingly, in order to improve power savings, a processing node tracks probe activity level associated with its cache. The processing node and/or processing system further predicts an idle duration. If the probe activity level increases above a threshold probe activity level, and the idle duration prediction is above a threshold idle duration threshold, the processing node flushes its cache to prevent probes to the cache. If the probe activity level is above the threshold probe activity level but the predicted idle duration is too short, the performance state of the processing node is increased above its current performance state to provide enhanced performance capability in responding to the probe requests.

In an embodiment, a method is provided that includes tracking probe activity level in a processing node, determining a predicted idle duration of the processing node, and flushing cache memory in the processing node if the probe activity level increases above a first probe activity level threshold and the predicted idle duration is above an idle duration threshold. The method may further include increasing a performance state of the processing node to a first performance state higher than a current performance state if the predicted idle duration is below the idle duration threshold, and if the probe activity level is above the first probe activity level threshold.

In one embodiment, a processing system is provided that includes a cache memory in a processing node. A probe tracker tracks probe activity level associated with the cache memory while the processing node is in a low performance state. Control functionality flushes the cache memory in response to the probe activity level being above a probe activity level threshold and a predicted idle duration of the processing node being greater than a threshold idle duration. The processing system is responsive to the predicted idle duration being below the threshold idle duration and the probe activity level being above the probe activity level threshold, to increase the performance state of the processing node to a first performance state higher than the current performance state.

BRIEF DESCRIPTION OF THE DRAWINGS

The present invention may be better understood, and its numerous objects, features, and advantages made apparent to those skilled in the art by referencing the accompanying drawings.

Note that the use of the same reference symbols in different drawings indicates similar or identical items.

DESCRIPTION OF THE PREFERRED EMBODIMENT(S)

Figure 1:
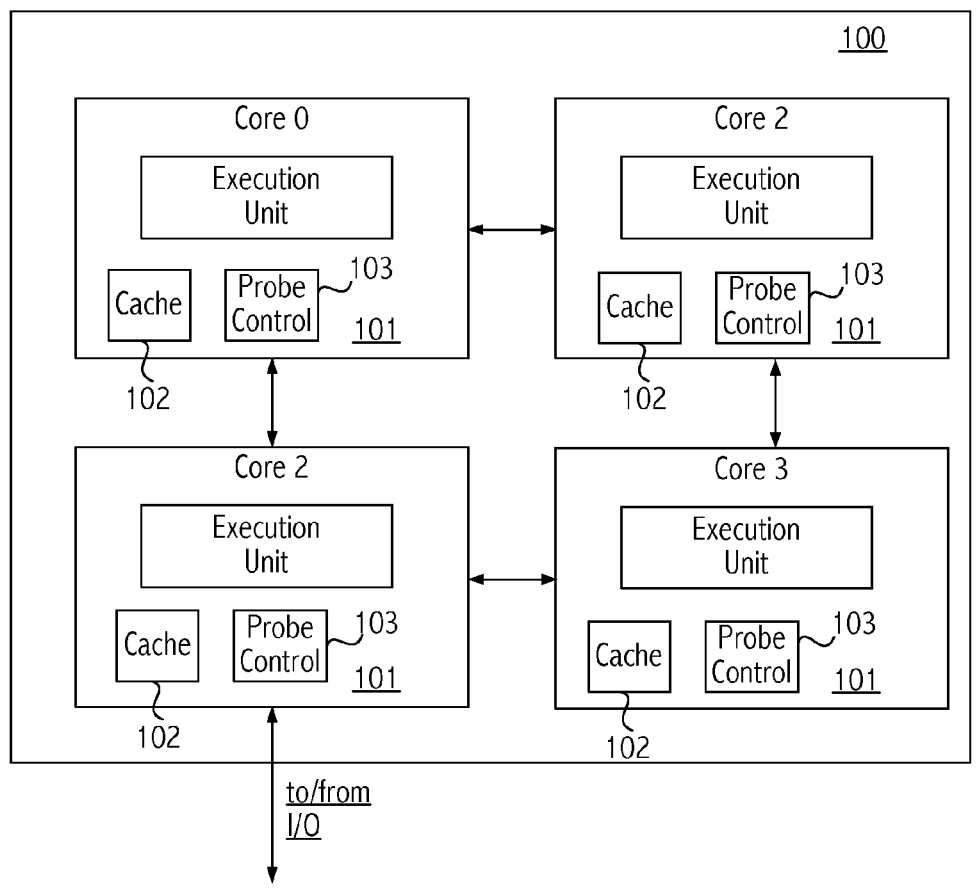
FIG. 1 illustrates a multi-core processor according to an embodiment of the present invention.

Referring to FIG. 1, a high-level block diagram illustrates a multi-core processor embodiment 100 where each core 101 or node includes cache memory 102 and probe control 103, which is described further herein. In the caching system of FIG. 1, each processing node in the system needs to maintain coherency in the memory by responding to probing requests (providing dirty data from cache, cache line invalidation, etc.) coming from other nodes or the input/output (I/O) domain, even if the processing node is in a low performance state or idle state. Thus, even though local copies of memory locations may be maintained in the various caches, coherency is maintained in the memory system. However, while the performance state of requesting nodes of a probe operation may be effectively controlled by evaluating utilization, that approach does not increase the performance state P of responding nodes in a direct way. The utilization-based performance control applicable to the requesting nodes leaves overall system performance vulnerable in cases where the responding node is a bottleneck.

The servicing of probing requests by the responding node does not contribute to increased utilization of the node itself (based on the node's execution stream) since the node can be in the idle state but still respond to probe requests. Additionally, a node's execution stream can be totally independent of probe responses, and therefore coherent activity in a responding node does not lead to a higher execution utilization that normally triggers the increase of the performance state. If a responding node is in a low performance state and is probed by numerous requesting nodes, its probe responding ability (probing bandwidth), which is dependent on the clock frequency of the responding node, may turn into a performance bottleneck and start causing performance loss with respect to application threads running on requesting processing nodes. Accordingly, it is useful to identify scenarios where the probing bandwidth of a responding processing node is insufficient and to address the lack of bandwidth by prompt and controllable transition of the responding node to a higher performance state. Once the burst of probing activity is finished and extra bandwidth is no longer needed, the responding node may be transitioned back to its previous performance state dictated by its execution utilization.

One approach to addressing potential probing response bottlenecks is a software-based solution in those systems where the operating system (OS) or high-level software handling of system devices can properly tune the processor P-state. One software-based solution requires the OS or higher-level software to re-evaluate the processor P-state more frequently (in order to properly respond to a burst of activity) and thus wakes up the processor more frequently for this re-evaluation with any application. This approach likely leads to higher power consumption with an application where such frequent re-evaluation is unnecessary. Making the OS or higher-level behavior more sophisticated and not application-invariant leads to additional overhead in the idle handlers or routines (where P-state re-evaluation happens as a rule) and therefore to a higher power consumption as well. Generally speaking, the granularity of the software-based solution provides no match with a hardware-based approach and is not able to promptly identify both the start of probing activity and the end of probing activity. The latter (end of probing activity) is equally important to identify for power savings, as a processor should not be left in a higher performance state for extra time since that also leads to extra power consumption, which degrades the performance/watt.

Another solution is a hardware-based solution that provides shared voltage/clock planes for all requesting and responding nodes. Such a hardware configuration increases the frequency of the responding node (core) when the requesting node (core) increases its frequency. Slow responses of the responding node will contribute to the increased utilization of the requesting node (core). Thus, software controlling the performance state of the requesting node will increase the performance state of the requesting node, and the responding node performance state will be increased as well (due to the shared frequency and voltage planes), thus eventually increasing the probing bandwidth of the responding core. However, this approach consumes extra power in multi-core processors in situations where applications are running on only a single or a few of the nodes (cores), which is the most typical type of workload in the mobile or ultra-mobile market segments. Further, the software usually fails to respond immediately to the need for a higher clock frequency due to a utilization increase of the requesting node (core), with the time interval typically ranging from a few hundreds of microseconds to milliseconds, which can lead to performance loss over this interval.

Thus, in an embodiment of the invention, each processing node tracks its probing activity. If the level of probing activity exceeds a threshold, the performance state of the processing node is elevated to a minimal performance floor MinPstateLimit, to address the increased requirement for probing activity bandwidth. After probing activity goes below the threshold minus associated hysteresis, the processing node transitions back to its previous performance state (P-state) in situations where its previous P-state is lower (from the performance standpoint) than the MinPstateLimit. Note that in some embodiments, the hysteresis value may be zero and in other embodiment may be fixed or programmable.

Figure 2:
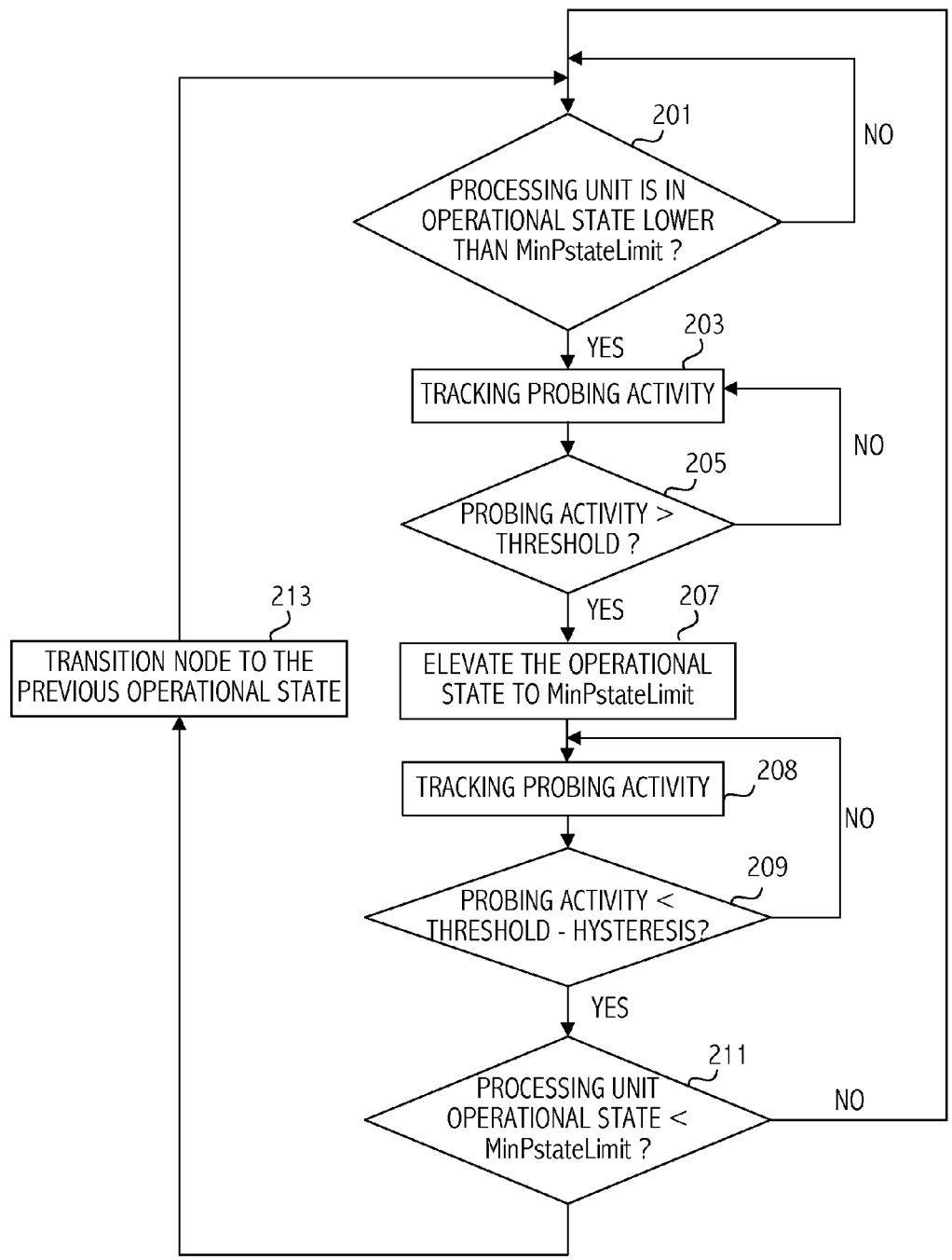
FIG. 2 illustrates a flow diagram of an embodiment of the invention having a single threshold.

The flowchart of FIG. 2 illustrates an exemplary decision process that may operate in probe control logic 103 (see FIG. 1) according to an embodiment of the invention. In 201, the node determines if the processing unit is in a performance state that is lower than the MinPstateLimit. If it is not in a lower state, then the current performance state is sufficient to handle probing activity and the flow remains in 201. If the current performance state is lower, then in 203 the node tracks probing activity. In 205, if the probing activity is greater than the threshold, then the node elevates the performance state to MinPstateLimit in 207 and continues to track the probing activity in 208. Note that the control logic to adjust performance states is assumed, for ease of illustration, to be part of the probe control logic 103. In some embodiments, it may be separate from the probe control logic. Controlling performance states of processing nodes using voltage and frequency is well known in the art and will not be described in detail herein. If the probing activity remains above the threshold minus a hysteresis factor, the node stays in the MinPstateLimit to address the probing activity. If, however, the probing activity goes back down to a level below the threshold minus a hysteresis factor in 209, the node determines in 211 whether the prior performance state (in steps 201 and 203) was less than the MinPstateLimit. If so, the node transitions to the previous lower performance state in 213 and then returns to 201 to determine whether the current performance state is adequate to address a probe activity increase above the threshold level. Note that transition to the lower performance state does not happen in 211 if the current performance state of the processing node has been increased to MinPstateLimit or higher by the normal flow managed by software (or hardware) based on the processing node utilization factor.

The embodiment illustrated in FIG. 2 includes only one probe performance threshold addressed by the performance state MinPstateLimit. Any performance state (P-state) higher than MinPstateLimit is assumed to satisfy worst case probe bandwidth requirements. However, other embodiments can have more than one threshold associated with probe bandwidth. A higher probe bandwidth requirement requires a higher operational P-state to address the probe bandwidth limitation. Table 1 illustrates an embodiment having three performance states (P-states) corresponding to different requirements for probing bandwidth:

TABLE 1

| P-state | Probins Activity Threshold | Hysteresis |
|---------|----------------------------|------------|
| Pm      | ProbActM                   | HystM      |
| Pn      | ProbActN                   | HystN      |
| Pk      | ProbActK                   | HystK      |

For the P-states, Pm>Pn>Pk. From the performance standpoint, PrbActM>PrbActN>PrbActK. The hysteresis values, HystM, HystN, and HystK may be identical, or may be different for each threshold. The hysteresis values may be configurable, along with the thresholds.

The processing node remains in P-state Pm as long as probing activity remains above (ProbeActivityM-HysteresisM). Once the probing activity drops below (ProbeActivityM-HysteresisM) and if the earlier performance state (before the increase in probe activity) is lower than Pm, the processing node transitions to a lower performance state. Note that the transition to a lower performance state does not happen if the current performance state of the processing node has been increased to Pm or higher by normal flow managed by software (or hardware) based on the processing node utilization factor.

Figure 3A:
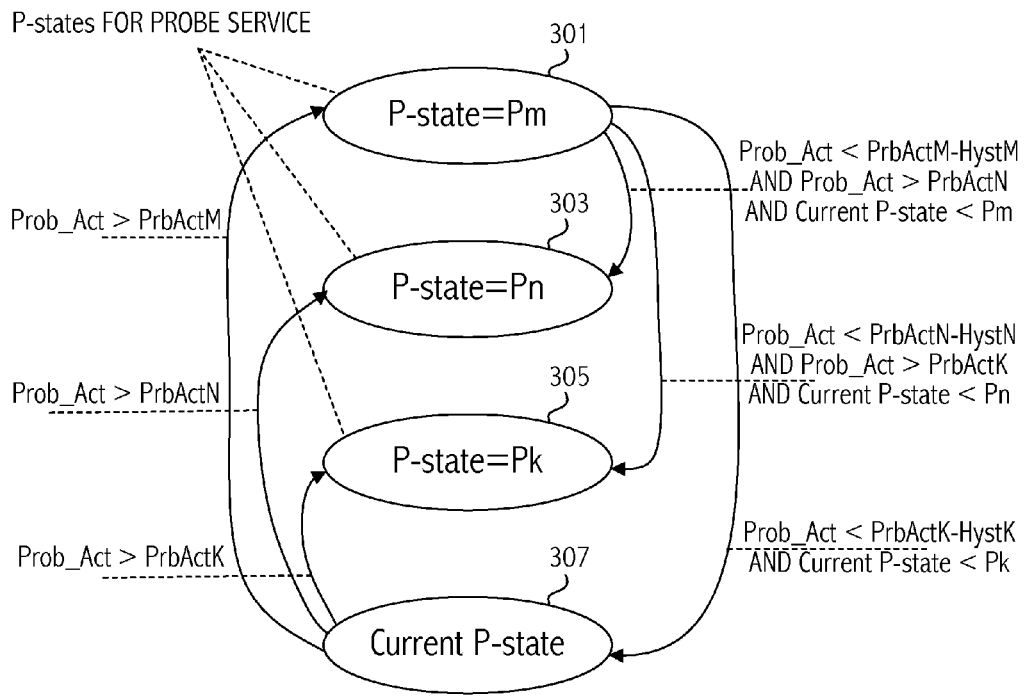
FIG. 3A illustrates a state diagram of an embodiment of the invention having multiple thresholds.
Figure 3B:
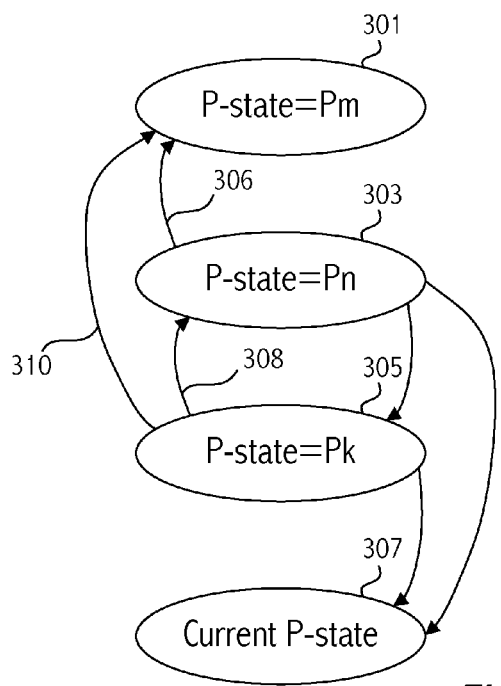
FIG. 3B illustrates a state diagram of an embodiment of the invention having multiple thresholds.

FIGS. 3A and 3B illustrate the inter-state transitions for embodiments with more than one probe performance threshold, with each performance threshold corresponding to a different level of probing activity. The state transitions may be implemented in probe control logic 103 (FIG. 1). Once the probe activity exceeds one of the thresholds, the responding node is transitioned to the P-state corresponding to the level of probing activity. That helps to ensure that a responding node in idle state will reside in the minimal performance state (or even in the retention state) for all the time except for periods of increased probing activity where a higher performance state (P-state) is required. Referring to FIG. 3A, assume Pm (301)>Pn (303)>Pk (305)>Current P-state (307) from the frequency standpoint. Then, if an increase in probe activity occurs while in P-state 307 to a higher probe activity (Prob_Act) level, then the node may enter one of the P-states Pk, Pm, or Pn depending on the level of probe activity as described below. The following describes the transition-up of the processing node assuming the node is currently in a low power state 307.

If (Prob_Act>PrbActM), then P-state=Pm
Else If (Prob_Act>PrbActN), then P-state=Pn
Else If (Prob_Act>PrbActK), then P-state=Pk In addition, in an embodiment, the node may transition up to a next higher-level P-state when in P-state Pn 303 or Pk 305 as shown in FIG. 3B. If the node detects increase probe activity while in P-state Pn 303, (Prob_Act>PrbActM), the node transitions via 306 to P-state Pm 301. If the node detects an increase in probe activity while in P-state Pk 305 (PrbActM>Prob_Act>PrbActN), the node transitions to P-state Pn 303 via transition 308. If the node detects an increase in probe activity while in P-state Pk 303 (Prob_Act>PrbActM), the node transitions to P-state Pm 301 via transition 310.

An additional aspect in an embodiment is to lower the P-state of the idle node to the minimal P-state if the probing activity is below the threshold. If software or hardware, responsible for utilization-based setting of the P-state of the processing node, has left it in sub-optimally high P-state (higher than MinPstateLimit), the probing P-state control function can lower the node P-state to Pmin (minimal operational P-state) or even to the retention power state so that the node can still respond to the non-bursty or lower level probing activity while saving power. The following describes the transitioning down shown in FIG. 3A based on decreased levels of probe activity (Prob_Act):

If (Prob_Act<(PrbActM-HystM) AND Prob_Act>PrbActN AND Current P-state<Pm), then P-state=Pn
Else If (Prob_Act<(PrbActN-HystN) AND Prob_Act>PrbActK AND Current P-state<Pn), then P-state=Pk
Else If (Prob_Act<PrbActK-HystK AND Current P-state<Pk), then P-state=Current P-state Similarly, as shown in FIG. 3B, in an embodiment, the node may transition down from one P-state 303 or 305 to the appropriate P-state to reflect a decrease in probe activity. For example, while in P-state Pn 303, the node may transition to either P-state Pk 305 or the current P-state 307 depending upon probe activity. If the probe activity decreases such that (Prob_Act<PrbActN-HystN AND Prob_Act>PrbActK), the node transitions to P-state Pk 305. If the probe activity decreases while in P-state Pn 303, such that Prob_Act<PrbActK-HystK, then the node transitions to the current P-state 307. Similarly, if probe activity decreases while in P-state Pk 305, such that Prob_Act<PrbActK-HystK, then the node transitions to the P-state 307.

Thus, the control logic will transition the power state up or down based on the current probe activity level to try to match the current power state the probe activity needs. That can help avoid bottlenecks in the responding nodes while still striving to achieve power savings where available.

In another embodiment, the probing activity can trigger the flushing (write-back invalidate and disabling) of the node's caching system when the node is idle and its probing activity exceeds a threshold. As used herein, a prediction of idleness with respect to a processor node means that it is predicted that a processor node will remain in a power savings state (a non-C0 state) and interrupts or wake-up events are not expected to occur and wakeup the processor node within some time interval. The interval should be long enough to ensure that the power consumed by cache flushing and power down does not exceed the power that will be saved. If the predicted idle interval is not long enough or if it is incorrect, e.g., if an interrupt is received soon after flushing the cache, the cache will have to be re-enabled and more power can end up being consumed than saved with the additional potential risk of performance loss.

Figure 4A:
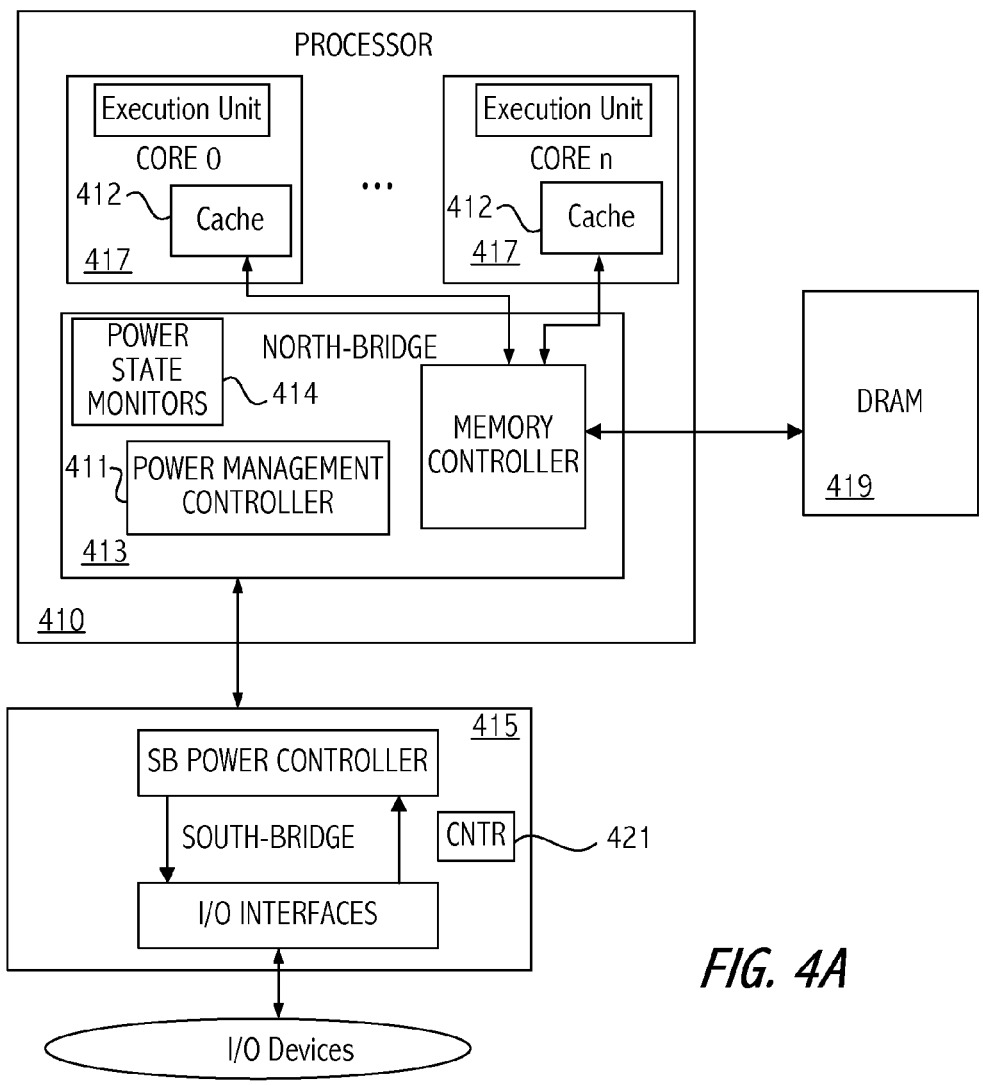
FIG. 4A illustrates a processor system in which an idleness prediction may be used to assist in determining whether to flush a cache memory.

Cache flushing based on idleness prediction and probe activity may be useful for multi-node systems or for nodes with a relatively short cache flushing time. The decision to flush may be based on factors such as probing activity exceeding a probe threshold (meaning that power consumed by the responding node in response to the cache probing is getting higher than power associated with flushing the caching system) and the node is predicted to remain idle for a sufficient time. Note that flushing the cache requires writing back valid data in the cache to higher level memory and invalidating all the cache lines. Referring to FIG. 4A, when the conditions for cache flush exist as described herein, the cache controller forming part of cache 412 flushes the cache in a manner well known in the art by writing the valid cache lines, e.g., to DRAM 419, and marking them as invalid in the cache. The cache controller may receive alerts from various parts of the NorthBridge or SouthBridge with respect to idleness as described below and combine that information with probe activity to determine whether to flush the cache.

Various approaches to predicting idleness may be used in combination with determining probe activity. Referring still to FIG. 4A, illustrated is a processor 410, with cores 417, NorthBridge 413, DRAM 419 and SouthBridge 415. Approaches to predicting idleness include making idleness predictions based on internal trackers and activity trackers typically found in the NorthBridge 413 (or more generally in those parts of the processor integrated circuit (the Uncore) that are not the processor cores, which typically includes such functionality as the memory controller and power management). Additionally, I/O subsystem activity predictions, e.g., interrupts, incoming or outgoing transfers, and timer-ticks, may also be utilized in the prediction of idleness and based in a separate integrated circuit (e.g., the SouthBridge 415).

One approach to predicting idleness is to track periodic timer-tick interrupts. The start of the previous interrupt is known and since the interrupt is periodic according to the Timer-Tick interval, it is also known how soon the next interrupt will be. The time to the next interrupt is calculated as: [Timer-Tick-Interval−Time-distance from the previous timer-tic interrupt]. If the result is greater than a threshold (resultant time-distance>threshold), then the cache may be flushed to save power if the probe activity level is sufficiently high. The appropriate count logic to track the periodic timer-tick interrupt may be resident in CNTR 421 in the SouthBridge 415 or in other logic in the NorthBridge 413.

Figure 4B:
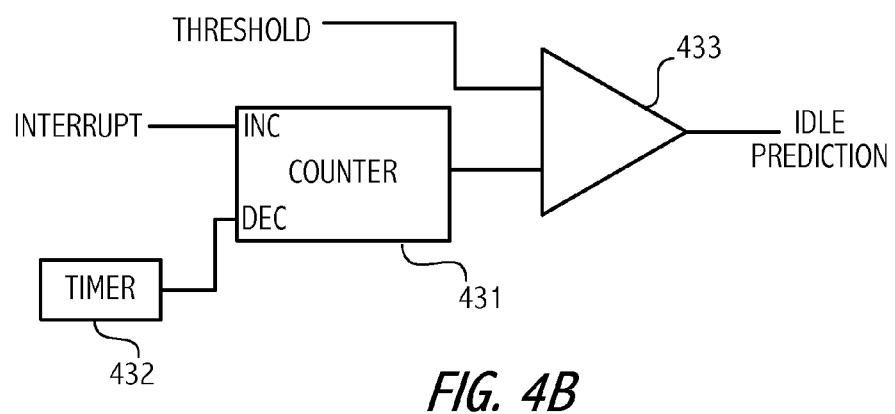
FIG. 4B illustrates an embodiment for determining idleness.

Another way to predict idleness is interrupt rate tracking FIG. 4B illustrates a high-level block diagram of an embodiment for interrupt rate tracking. This may be useful with interrupt-dense streams, e.g., disk data transfers or video streams. Interrupts are tracked as follows. A counter 431 is incremented whenever an interrupt comes in and decremented every <interval> as determined by timer circuit 432. This interval may be defined as an appropriate interval between interrupts for flushing the cache. The counter state is compared to a threshold in comparator 433. If the counter state is below the threshold, that implies that the interrupt rate is lower or at the same level as a rate that allows for flushing cache with no performance loss/power impact if the probe count is sufficiently high. If the counter state is above the threshold, that means that interrupts are too frequent and the node should refrain from flushing the cache. Additional details on interrupt rate tracking can be found in the application entitled "Method and Apparatus for Transitioning Devices Between Power States Based on Activity Request Frequency," application Ser. No. 12/566,930, filed Sep. 25, 2009, published as U.S. Patent Application Publication No. 2011-0078478, naming Alexander Branover et al. as inventors, which application is incorporated herein by reference in its entirety. More generally, a comparator such as the comparator 433 may be used to compare an idle duration threshold to any duration prediction from whatever source to generate an indication of whether an idle duration prediction is above an idle duration threshold and therefore cache flushing may be warranted.

Still another way to predict idleness is to evaluate the input/output (I/O) domain. That may be accomplished with communication with the SouthBridge integrated circuit 415 that may have more knowledge of I/O domain activities and therefore may be able to provide information on idleness not otherwise readily available to the processor node. Thus, in certain embodiments, the SouthBridge can provide an alert about an upcoming interrupt event. For example, the SouthBridge can notify the power management controller 411 in the NorthBridge if the SouthBridge determines that an interrupt is expected to come in less than a threshold interval. The SouthBridge can obtain this knowledge in a number of ways. For USB devices it is more straight-forward due to periodicity of USB traffic. The SouthBridge can also send polling requests to the I/O devices, to determine I/O status. A SouthBridge can alert about upcoming end-of-the-DMA interrupts. Additional details on approaches to predicting node idleness have been described, e.g., in NORTH-BRIDGE TO SOUTH-BRIDGE PROTOCOL FOR PLACING PROCESSOR IN LOW POWER STATE, naming Alexander Branover et al. as inventors, application Ser. No. 12/436,439, filed May 6, 2009, published as U.S. Patent Application No. 2010-0287394, which application is incorporated herein by reference in its entirety.

Additionally, a number of power state monitors 414 may be used to track events that may impact idleness predictions. While shown separately, such monitors may be located in the power management controller 411 of NorthBridge 415. These monitors include, e.g., a C0-timer based monitor and a non-C0 timer based monitor. A C0-timer based monitor works as follows. If the processing node resides in the C0 state for a time period less than a threshold time period, the counter is incremented. If the count value is above a threshold count value, which means that the node is in an idle phase a significant amount of the time, cache flush may be enabled if probe activity is sufficiently high. A non-C0 timer based monitor works similarly. If the processor node resides in the non-C0 state greater than a threshold time, the counter is incremented. If the counter is above a count threshold value, which indicates the node is in an idle phase, cache flush may be enabled if probe activity is sufficiently high.

Additional details on power state monitors can be found in the application entitled "Hardware Monitoring and Decision Making for Transitioning in and Out of Low-Power State," application Ser. No. 12/198,974, filed Aug. 27, 2008, issued as U.S. Pat. No. 8,156,362, naming Alexander Branover et al. as inventors, which application is incorporated herein by reference in its entirety.

Thus, a number of approaches can be used to predict idleness. Multiple ones of the approaches may be combined. For example, in an embodiment, multiple ways to predict idleness are utilized together to generate an idleness prediction used in a determination as to whether to flush the cache when probe activity is sufficiently high. For example, if one or more of the idle predictions fails to satisfy its idleness criteria, the cache is not flushed. Additionally, the idleness thresholds for the various idleness predictions can be programmable so as to match expected conditions of particular systems.

Figure 4C:
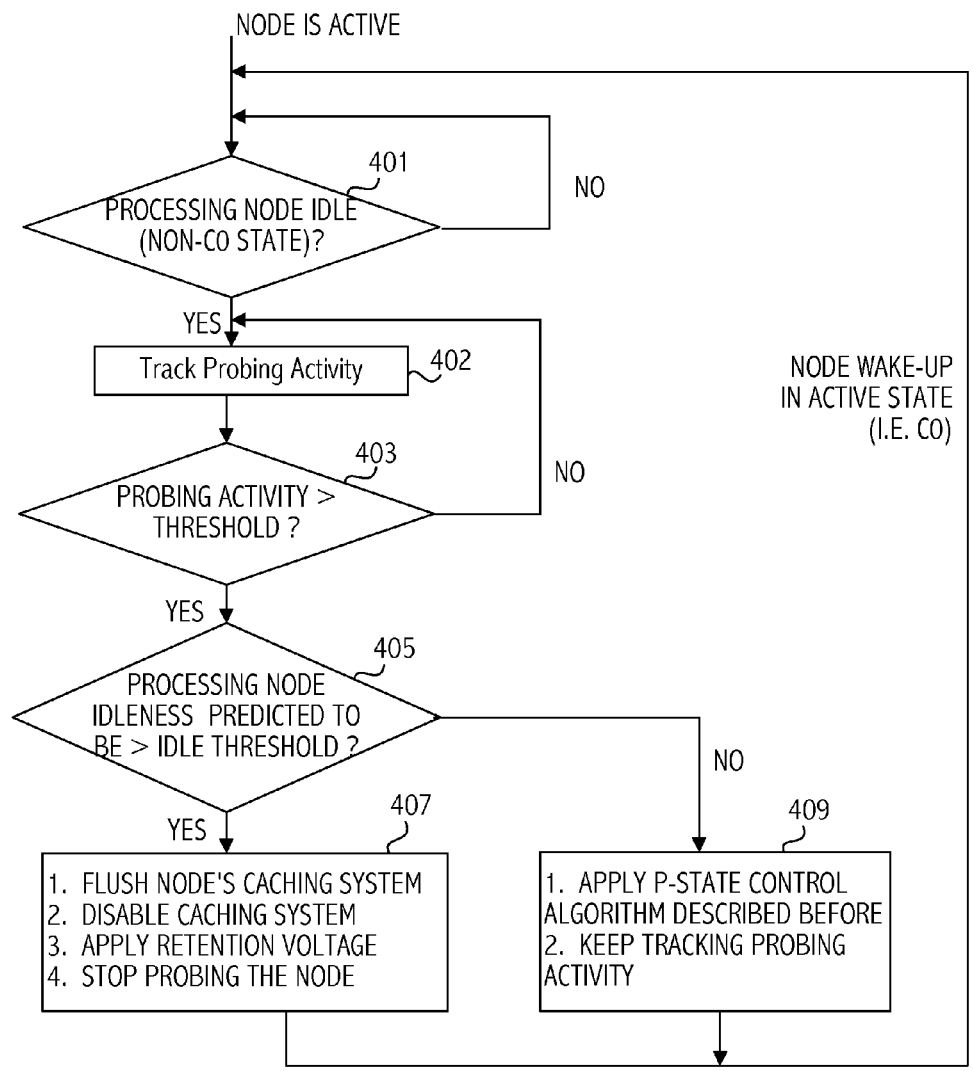
FIG. 4C illustrates a flow diagram of an embodiment in which an idleness prediction and probe activity are used to determine whether to flush the cache memory.

FIG. 4C illustrates an exemplary flow diagram of an embodiment for cache flushing based on probe activity and node idleness prediction. In 401, if the processing node is in the idle state, then the processing node tracks probing activity in 402, and in 403, the node checks for probe activity being greater than the probe threshold. If it is, then in 405, the flow checks if the processing node idleness is predicted to be greater than an idle threshold. If so, then in 407 the processing node flushes its cache, disables its caching system, applies a retention voltage or other appropriate power savings voltage, and the system stops probing the node. If, however, the predicted duration of the node idleness is below the threshold, thus making cache flushing unattractive since it does not save power or save sufficient power, the P-state control algorithm (described above) may be applied in 409 and the node continues to track probing activity and adjust the P-state, if necessary, according to the level of probing activity. Further, portions of the control functionality defined by FIG. 4C may be located in the NorthBridge or elsewhere in the system and combined with cache control functionality in a particular processing node.

Figure 5:
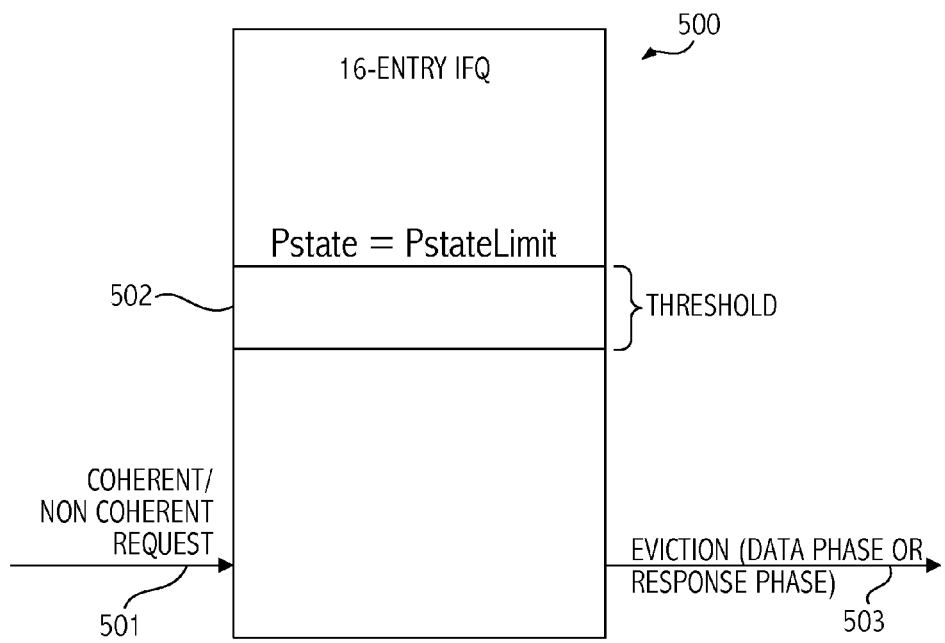
FIG. 5 illustrates an embodiment for tracking probe activity using an In-Flight Queue (IFQ) structure having a single threshold.

One embodiment for tracking probe activity utilizes a queue structure referred to herein as an In-Flight Queue (IFQ) as shown in FIG. 5. The IFQ structure 500 is a multi-entry array that logically reflects the level of the probing activity. Any transaction (coherent or non-coherent) 501 is placed into an available entry of the IFQ and resides there until the eviction point. The transaction is de-allocated (evicted) from the IFQ at 503 after a response by the responding node. The response may be either the data phase (i.e. data movement from the processing node to shared memory or from shared memory to the processing node) for transactions involving data movement or after the response phase for transactions with no data movement (i.e. a request to invalidate cache entry in the local cache or memory of the processing node). The IFQ structure can be shared between processing nodes or be instantiated per processing node. The level of probing activity is represented by the number of active IFQ entries (entries which are populated with outstanding coherent requests pending completion).

In one embodiment, the node (or wherever the control functionality resides if it happens to be external to the node) compares the number of active IFQ entries with a single threshold 502. Note that the control functionality can reside internal or external to the node. If external to the node, it may still reside on the same die in the Uncore portion of the die as described above. If the number of entries exceeds the threshold, the transition to a higher P-state (MinPstateLimit) occurs. After the number of active IFQ entries drops to the level lower than the threshold minus hysteresis, the MinPstateLimit performance floor is cancelled and the processing node is transitioned back to the current P-state where the lower probing bandwidth can be addressed while running at lower power.

Figure 6:
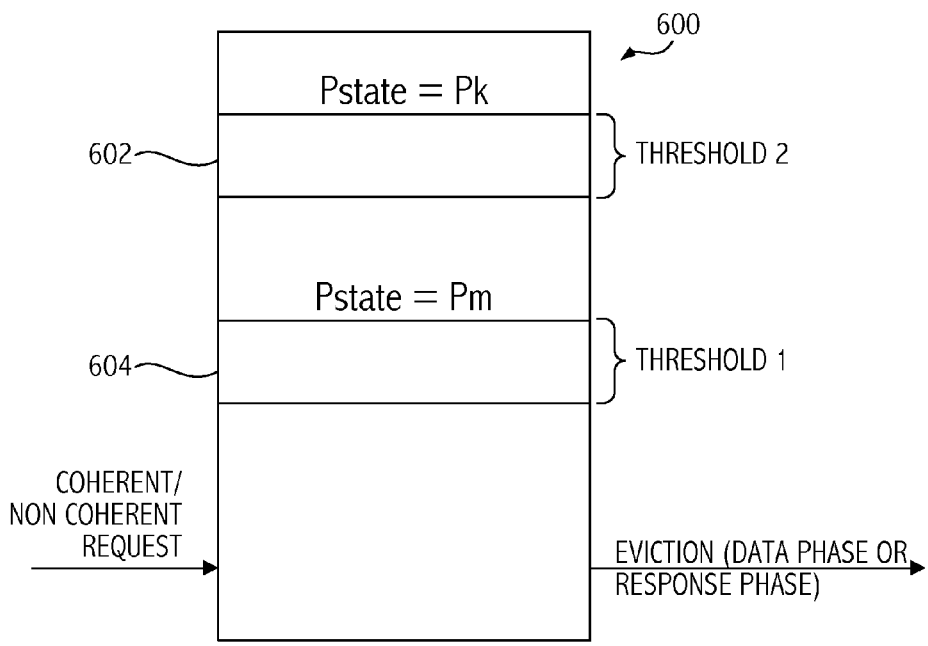
FIG. 6 illustrates an embodiment for tracking probe activity using an IFQ having multiple thresholds.

Other embodiments may utilize a multi-level IFQ-based approach shown in FIG. 6 wherein each level has an associated minimal performance level (P-state threshold) associated with a different probing bandwidth. For example, 16-entry IFQ structure 600, may have two thresholds 602 and 604 corresponding to P-states Pm and Pk, respectively, representing an increased need in probing bandwidth. The inter-state transition may be accomplished as shown in FIGS. 3A and 3B.

Figure 7:
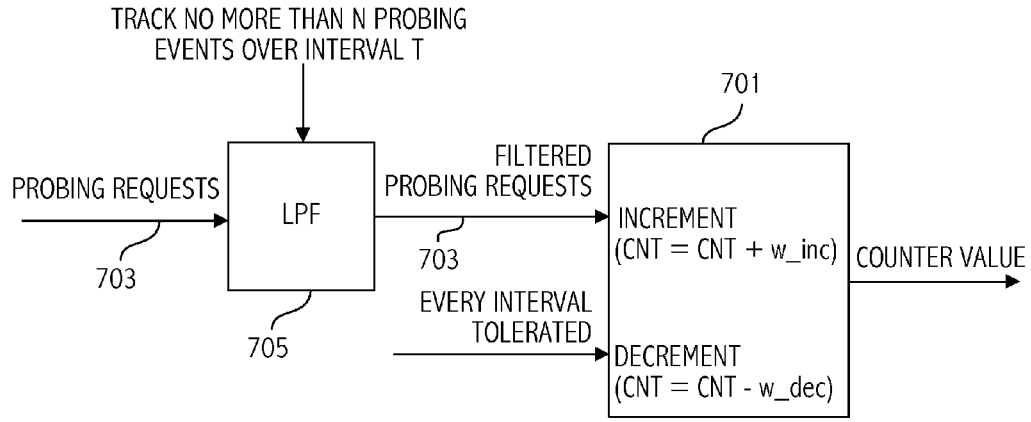
FIG. 7 illustrates another embodiment for tracking probe activity using a counter having different increment and decrement criteria.

In other embodiments, different approaches to tracking probing activity may be used. For example, in systems having hidden, unavailable or a difficult-to-track completion phase for the probing requests, the tracking approach can be predicated on a probe-count mechanism with different increment and decrement rates. For example, referring to FIG. 7, counter 701 incremented (CNT=CNT+w_inc) every time a new probing request 703 dispatched to the processing node is identified. The count value is decremented (CNT=CNT−w_dec) every configurable time interval (IntervalTolerated) that matches the probing rate (bandwidth) associated with the specific P-state of the processing node. In an embodiment, the configurable time interval matches the maximum probing bandwidth associated with the specific P-state. Thus, it is assumed that the probing requests are serviced at a particular rate even if the actual response (data movement, response phase for transactions with no data movement) is not tracked.

Any new probing request causes counter to increment (CNT=CNT+w_inc) where w_inc is a configurable weight added to the current value of the counter. In some embodiments, the increment/decrement values may be configurable and their settings dependent on customer or higher-level software preference (performance biased, balanced or power biased). For a performance biased setting, w_inc (increment weight) is set to higher value and w_dec (decrement weight) is set to lower value. For a power savings biased setting, these parameters may be set in the opposite way. Also, the IntervalTolerated value may be configurable depending on performance/power preference of the customer or high-level software. The counter value represents the level of probing activity and is compared with ProbeActivity thresholds to figure out an optimal P-state. A higher counter value requires a higher operational P-state in order to match an increased probing bandwidth that the current P-state cannot satisfy.

A low pass filter (LPF) 705 may be used to filter out bursts of probing activity, not properly representing the workload uniformity and leading to the over-increments of the counter and choice of the performance state (P-state) that may be sub-optimal from the performance/watt standpoint. Depending on the particular embodiment, a configurable (from 1 to N) number of probe requests is tracked over configurable interval T. The low pass filter may be designed in different ways to avoid over-counting of the probing requests in case the frequency of their appearance exceeds some configurable limit over time-interval. For example, the low pass filter may be implemented to track no more than n (where 1≤n≤N) probing events over interval T. Thus, if the number of probing events >n, the counter only counts n. The low pass filter supplies the filtered probing requests to the counter.

Alternatively, the low pass filter 705 may be implemented to average the number of probing events over multiple intervals T so that if a particular interval T happens to have a high burst of activity, that high burst is limited by the average over multiple intervals. The average may be implemented, e.g., as a moving average. In one implementation, probe requests are not supplied to the counter at a higher rate than the moving average.

The implementation of the low pass filter may of course influence how the weight w_inc is determined. Thus, for example, if the average over a number of time intervals is utilized, the weight may be scaled to reflect the time interval. In other embodiments, the counter may be supplied directly with probing requests with no filtering.

Aspects of the embodiments herein may be partially implemented in software stored in volatile or non-volatile memory associated with the processor shown in FIG. 1. Software may be stored in non-volatile portions of a computer system, loaded into volatile memory and executed. Thus, embodiments of the present invention may include features or processes embodied within machine-executable instructions provided by a machine-readable medium such as nonvolatile memory. Such a medium may include any mechanism which stores data in a form accessible by a machine, such as a microprocessor or, more generally, a computer system. A machine readable medium may include volatile and/or non-volatile memory, such as read only memory (ROM); random access memory (RAM); magnetic disk storage media; optical storage media; flash memory devices; tape, or other magnetic, optical or electronic storage medium. Such stored instructions can be used to cause a general or special purpose processor, programmed with the instructions, to perform processes of the present invention.

Note that some of the processes of the present invention may include hardware operating in response to programmed instructions. Alternatively, processes of the present invention may be performed by specific hardware components containing hard-wired logic such as state machines to perform operations or by any combination of programmed data processing components and hardware components. Thus, embodiments of the present invention may include software, data processing hardware, data processing system-implemented methods, and various processing operations, as described herein.

Thus, various embodiments have been described. Note that the description of the invention set forth herein is illustrative, and is not intended to limit the scope of the invention as set forth in the following claims. Variations and modifications of the embodiments disclosed herein may be made based on the description set forth herein, without departing from the scope of the invention as set forth in the following claims.

What is claimed is:

1. A method comprising:
    tracking probe activity level in a low-performance state processing node utilizing a probe counter with different increment and decrement values;
    setting the processing node to a performance biased setting by setting the increment value higher than the decrement value;
    predicting an idle duration of the processing node, wherein predicting the idle duration comprises satisfying at least two different idle predictions based on two or more of input/output activity, timers, interrupt rate tracking, and power state monitors;
    comparing the probe activity level to a probe activity level threshold; and
    flushing a cache memory in the low-performance state processing node if the probe activity level for the cache memory in the low-performance state processing node is above the probe activity level threshold and the predicted idle duration of the processing node is greater than an idle threshold.

2. The method as recited in claim 1 wherein flushing the cache memory further comprises write-back of valid cache data and invalidating the cache.

3. The method as recited in claim 1 further comprising applying a power savings voltage to the processing node.

4. The method as recited in claim 1 further comprising stopping probing the cache memory of the processing node.

5. The method as recited in claim 1 further comprising, if the predicted idle duration is below the idle duration threshold, and if the probe activity level is above the probe activity level threshold, increasing a performance state of the processing node to a first performance state higher than a current performance state.

6. The method as recited in claim 1 further comprising predicting the idle duration according to a frequency of received interrupts.

7. The method as recited in claim 1 further comprising predicting the idle duration according to a power state monitor monitoring duration of the processing node in a particular power state.

8. A processing system comprising:
    a cache memory in a processing node;
    a probe tracker to track probe activity level associated with the cache memory while the processing node is in a low performance state, the probe tracker including a counter having different increment and decrement values, wherein the counter is incremented by the increment value in response to a new probe request and the counter is decremented by the decrement value to reflect servicing of probe requests, wherein the increment value is set lower than the decrement value to set the processing node to a power savings biased setting; and
    control functionality to flush the cache memory in response to the probe activity level being above a probe activity level threshold and at least one predicted idle duration of the processing node being greater than at least one threshold idle duration, wherein the probe activity level threshold is non-zero.

9. The processing system as recited in claim 8 wherein the processing system is responsive to the predicted idle duration being below the threshold idle duration and the probe activity level being above the probe activity level threshold, to increase a current performance state of the processing node to a first performance state higher than the current performance state.

10. The processing system as recited in claim 8 further comprising idle duration logic responsive to generate multiple idle duration predictions based on multiple ones of I/O activity, timer-tick activity, frequency of received interrupts, and a power state monitor, and to compare multiple idle duration predictions to a threshold idle duration to determine if idleness criteria is satisfied to flush the cache memory.

11. The processing system as recited in claim 8 wherein the threshold idle duration is programmable.

12. The processing system as recited in claim 8 wherein a plurality of idle duration predictions are utilized to determine whether to flush the cache memory.

13. The processing system as recited in claim 8 wherein the idle duration is predicted according to a rate of received interrupts.

14. The processing system as recited in claim 8 wherein the idle duration is predicted according to one or more power state monitors.

15. The processing system as recited in claim 8 wherein the idle duration is predicted according to input/output activity.

16. The processing system as recited in claim 8 wherein the probe tracker further comprises:
    a low pass filter to filter out bursts of probing activity, the low pass filter supplying filtered probing requests to the counter.

17. The processing system as recited in claim 8 wherein the counter is decremented in response to a configurable time interval to reflect servicing of probe requests.

18. The processing system as recited in claim 17 wherein the decrement value matches a probing rate associated with a performance state of the processing node to reflect servicing of probe requests.

19. A method comprising:
    tracking probe activity level in a low-performance state processing node, wherein tracking probe activity level comprises utilizing a probe counter with different increment and decrement values;
    predicting the idle duration of the processing node, wherein predicting the idle duration comprises satisfying at least two different idle predictions based on two or more of input/output activity, timers, interrupt rate tracking, and power state monitors;
    comparing the probe activity level to a probe activity level threshold;
    flushing a cache memory in the low-performance state processing node if the probe activity level for the cache memory in the low-performance state processing node is above a probe activity level threshold and a predicted idle duration of the processing node is greater than an idle threshold; and setting the processing node to a power savings biased setting by setting the increment value lower than the decrement value.

20. A processing system comprising:
a cache memory in a processing node;
a probe tracker to track probe activity level associated with the cache memory while the processing node is in a low performance state, the probe tracker including a counter having different increment and decrement values, wherein the counter is incremented by the increment value in response to a new probe request and the counter is decremented by the decrement value to reflect servicing of probe requests, wherein the increment value is set higher than the decrement value to set the processing node to a performance biased setting; and
control functionality to flush the cache memory in response to the probe activity level being above a probe activity level threshold and at least one predicted idle duration of the processing node being greater than at least one threshold idle duration, wherein the probe activity level threshold is non-zero.

* * * * *